United States Patent
Boen et al.

(10) Patent No.: US 10,262,765 B2
(45) Date of Patent: Apr. 16, 2019

(54) METHOD AND FACILITY FOR INCINERATING, MELTING AND VITRIFYING ORGANIC AND METAL WASTE

(71) Applicant: Areva NC, Courbevoie (FR)

(72) Inventors: Roger Boen, Saint-Alexandre (FR); Patrice Charvin, Saint Romans (FR); Florent Lemont, Villeneuve les Avignon (FR); Aldo Russello, Tavel (FR)

(73) Assignee: ORANO CYCLE, Courbevoie (FR)

( * ) Notice: Subject to any disclaimer, the term of this patent is extended or adjusted under 35 U.S.C. 154(b) by 505 days.

(21) Appl. No.: 14/909,910

(22) PCT Filed: Aug. 7, 2014

(86) PCT No.: PCT/EP2014/067012
§ 371 (c)(1),
(2) Date: Feb. 3, 2016

(87) PCT Pub. No.: WO2015/018905
PCT Pub. Date: Feb. 12, 2015

(65) Prior Publication Data
US 2016/0189815 A1    Jun. 30, 2016

(30) Foreign Application Priority Data

Aug. 8, 2013 (FR) .................................... 13 57894

(51) Int. Cl.
*G21F 9/32* (2006.01)
*G21F 9/30* (2006.01)
(Continued)

(52) U.S. Cl.
CPC ................ *G21F 9/32* (2013.01); *C03B 5/005* (2013.01); *C03B 5/021* (2013.01); *F23G 5/085* (2013.01);
(Continued)

(58) Field of Classification Search
CPC ... G21F 9/32; G21F 9/34; G21F 9/305; G21F 9/30; G21F 7814/00; F27B 14/061;
(Continued)

(56) References Cited

U.S. PATENT DOCUMENTS 4,631,384 A    12/1986   Cornu
6,155,182 A * 12/2000   Tsangaris ................ F23G 5/008
                                                                                              110/229
(Continued)

FOREIGN PATENT DOCUMENTS

FR    2 541 428 A1    2/1983
FR    2 838 117 A1   10/2003
(Continued)

OTHER PUBLICATIONS

Search Report issued in French Patent Application No. FR 1357894 dated Apr. 17, 2014.
(Continued)

*Primary Examiner* — David J Laux
(74) *Attorney, Agent, or Firm* — Pearne & Gordon LLP

(57) ABSTRACT

The method according to the invention enables a facility having a rather reduced dimension, for incinerating to be used, melting and vitrifying mixed waste (30) introduced into a reactor (10), by means of a basket (18) in turn passing through an air lock (12). Plasma torches (14) burn all waste (30) contained in the basket (18). The waste is then lowered in a melting bath of a furnace (20) with an inductor (24) including a crucible-forming container (23). A combustion gas treatment train completes the facility.

(Continued)

The furnace (20) can be dismantled, after a series of treatments of several baskets (18) of waste (30) for disassembling the crucible-forming container (23) from the furnace (20).
Application in treating different radiologically contaminated and/or toxic mixed waste.

7 Claims, 1 Drawing Sheet

(51) Int. Cl.
| | |
|---|---|
| G21F 9/34 | (2006.01) |
| F27B 14/00 | (2006.01) |
| F27B 14/06 | (2006.01) |
| F27B 14/14 | (2006.01) |
| F23G 7/06 | (2006.01) |
| C03B 5/00 | (2006.01) |
| C03B 5/02 | (2006.01) |
| F23G 5/08 | (2006.01) |
| F23G 5/32 | (2006.01) |
| F23G 5/44 | (2006.01) |
| F23G 7/00 | (2006.01) |
| F27D 99/00 | (2010.01) |

(52) U.S. Cl.
CPC ............. *F23G 5/32* (2013.01); *F23G 5/448* (2013.01); *F23G 7/006* (2013.01); *F23G 7/063* (2013.01); *F23G 7/065* (2013.01); *F27B 14/00* (2013.01); *F27B 14/061* (2013.01); *F27B 14/14* (2013.01); *G21F 9/30* (2013.01); *G21F 9/305* (2013.01); *G21F 9/34* (2013.01); *F23G 2200/00* (2013.01); *F23G 2202/20* (2013.01); *F23G 2204/201* (2013.01); *F23G 2204/204* (2013.01); *F23G 2205/18* (2013.01); *F23G 2209/18* (2013.01); *F27D 2099/0015* (2013.01); *F27D 2099/0031* (2013.01); *Y02P 10/253* (2015.11); *Y02P 40/52* (2015.11)

(58) Field of Classification Search
CPC .......... F27B 14/14; F27B 14/00; F23G 7/063; F23G 5/448; F23G 7/006; F23G 7/065; F23G 5/085; F23G 5/32; F23G 2204/204; F23G 2200/00; C03B 5/005; C03B 5/021; Y02P 10/253
See application file for complete search history.

(56) References Cited

U.S. PATENT DOCUMENTS

| 7,299,756 B2 * | 11/2007 | Gnedenko | .............. C03B 5/005 110/250 |
|---|---|---|---|
| 7,363,866 B2 * | 4/2008 | Gnedenko | .............. C10B 19/00 110/101 C |
| 7,658,155 B2 * | 2/2010 | Chapman | ................ F23G 5/006 110/236 |
| 8,109,218 B2 * | 2/2012 | Chapman | ................ F23G 5/006 110/346 |
| 8,671,855 B2 * | 3/2014 | Capote | ................... F23G 5/006 110/250 |
| 9,500,362 B2 * | 11/2016 | Hirson | .................... F01K 25/00 |
| 2005/0120754 A1 | 6/2005 | Girold | |
| 2008/0281141 A1 | 11/2008 | Pinet | |
| 2011/0062013 A1 * | 3/2011 | Tsangaris | .............. F23G 5/0276 202/209 |
| 2011/0144408 A1 | 6/2011 | Gruber | |
| 2012/0277515 A1 | 11/2012 | Lemont | |
| 2013/0126445 A1 | 5/2013 | Lemont | |
| 2015/0360267 A1 | 12/2015 | Boen | |
| 2015/0369480 A1 | 12/2015 | Boen | |

FOREIGN PATENT DOCUMENTS

| FR | 2 888 576 A1 | 7/2005 |
|---|---|---|
| WO | 97/49641 A2 | 12/1997 |
| WO | 03/067166 A2 | 8/2003 |

OTHER PUBLICATIONS

International Preliminary Report on Patentability issued in Application No. PCT/EP2014/067012 dated Jul. 9, 2015.
International Search Report issued in Application No. PCT/EP2014/067012 dated Oct. 24, 2014.
Written Opinion issued in Application No. PCT/EP2014/067012 dated Oct. 24, 2014.

* cited by examiner

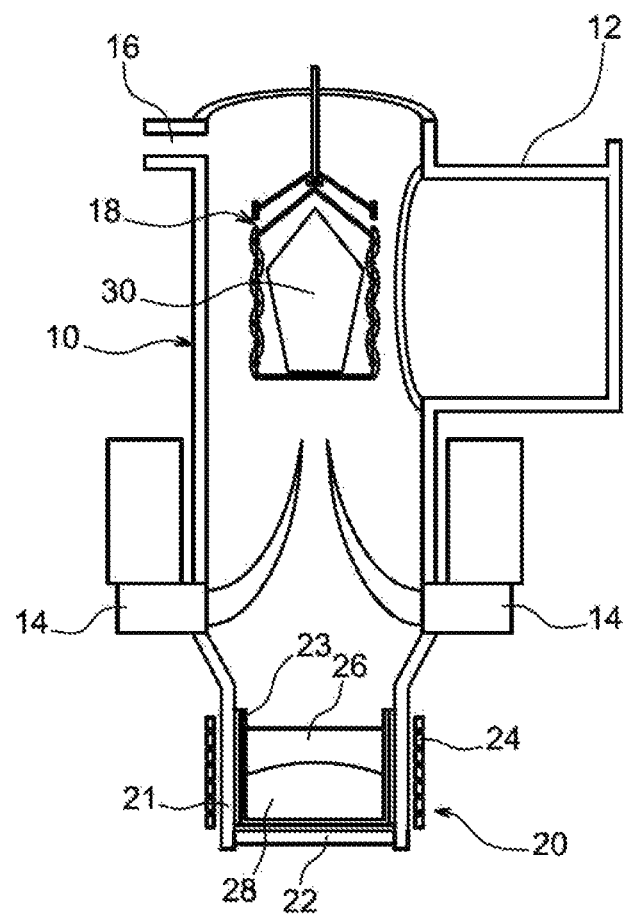

METHOD AND FACILITY FOR INCINERATING, MELTING AND VITRIFYING ORGANIC AND METAL WASTE

FIELD OF THE INVENTION

The present invention relates to the field of the treatment of mixed hazardous waste for the purpose of packaging and warehousing them for long periods of time in appropriate containers.

Mixed waste means mixtures of metal and organic waste likely to also contain mineral and/or other materials.

Hazardous waste means radiologically contaminated and/or toxic waste.

The invention thus more precisely relates to the treatment through incinerating, melting and vitrifying mixed hazardous waste, as well as induction melting furnaces and combustion/incineration reactors, in particular of the plasma type.

PRIOR ART AND PROBLEM TO BE SOLVED

Within the scope of operating and/or dismantling nuclear facilities, or other facilities containing toxic or contaminating elements, it turns out to be essential to treat waste produced therefrom, whether consisting of metal waste, for example of stainless steel, copper and/or aluminium, and/or organic waste, as for example polyvinyl chloride (PVC) and polyethylene terephthalate (PET), or even mineral waste, such as glass fibre. All these materials can be contaminated by radioactive elements, and in particular fissile materials. Generally, these waste are placed in PVC bags. However, this waste must be treated, packaged to minimize the volume thereof and in a form which enables them to be warehoused and stored for long periods of time, depending on their radioactivity.

There are already methods suitable for treating mixtures of mineral waste (for example glass fibre) and organic waste (PVC, PET), this waste being fed in a ground form at a centimeter particle size.

French patent application FR 2 838 117 is an example thereof. The facility, described therein, consists of an oxygen plasma medium combustion reactor with a cool wall, placed above an induction melting furnace with a cool wall glass including a system for sequentially casting the glass matrix. However, such a facility cannot treat metal waste, nor handle of entire waste bags. Moreover, the criticality management in the melting furnace part is difficult because of the risk of accumulating plutonium in the glass which remains in the furnace bottom after each casting or in the combustion zone in which the plasma torches are located.

Another method uses a plasma medium combustion reactor with a hot, that is refractory, wall placed above a furnace rotating about a vertical axis to melt glass and metal by plasma, the wall being hot, that is refractory. It includes a system for sequentially casting glass and metal and can treat entire bags of organic, mineral and metal mixtures. However, its large dimensions and complex maintenance, because of the wear of the refractory materials, make it unattractive for an implementation in a radioactive medium and could further include criticality management problems.

The purpose of the invention is to overcome these different drawbacks of these facilities of prior art and to provide a method which meets the following purposes:

oxidizing the organic fractions into water, carbon dioxide, or into hydrogen chloride and decontaminating the gases before they are neutralized;

dissolving ashes from the oxidation of the organic fraction of this waste in a glass matrix, such as homogeneous glass, or glass-ceramic;

dissolving the mineral fraction in the glass matrix;

melting the metal fraction;

dissolving the radioelements in their glass phase for the most oxidizable elements, or in their metal phase for the least oxidizable elements; and handling the entire waste bags, without opening them, nor grinding them, to avoid any dissemination of the radioactive contamination.

In the case where this waste is contaminated by plutonium, the treatment method has also to enable criticality to be managed, both in the facility where the treatment method is implemented and in the final product derived from this treatment.

The method has to be exploitable in a radioactive medium.

Finally, the treatment method has to result in a final waste pack, that can include at least two phases, a glass phase and a metal phase.

DISCLOSURE OF THE INVENTION

A first main object of the invention is a method for incinerating, melting and vitrifying hazardous mixed waste, that is mixtures of radiologically contaminated and/or toxic metal and organic waste, and likely to also contain mineral and/or other materials.

According to the invention, the method comprises the following successive steps of:

introducing in an oxygen plasma medium incinerating reactor with a cold or warm metal wall, by means of a basket of glass fibre, waste placed in a bag;

incinerating waste in the reactor;

melting residual fractions derived from the incineration of waste and the basket in an induction furnace with melting in a crucible-forming container, called "In Can Melter" placed below the reactor;

vitrifying molten residual fractions into a glass matrix contained in the crucible;

repeating this cycle for each basket of waste;

dismantling the furnace and disassembling the crucible-forming container, at the end of the process.

It is to be noted that a cool or warm wall means a wall with a temperature lower than 150° C.

Advantageously, this method further comprises treating the residual gases from incineration, derived from this method, and including the following phases:

post-combusting gases derived from the incineration of waste;

possibly phosphatizing metal chlorides formed during the incineration when the waste, in particular organic waste, comprises chloride;

filtering dust;

recycling the dust in the furnace;

neutralizing the decontaminated gases.

Once the different waste treatment cycles are ended, the method further comprises the following phases of:

shutting down the plasma torches of the reactor and the furnace; and cooling the entire facility;

dismantling the furnace with respect to the reactor;

inspecting the reactor.

A second main object of the invention is a facility for incinerating, melting and vitrifying waste using the above method.

According to the invention, this facility comprises:

A melting type induction furnace in a crucible-forming container (In Can Melter); and a reactor with a cool or warm metal wall comprising at least one plasma torch and an air lock for introducing waste baskets, this reactor being dismountably placed on the furnace.

According to the invention, the facility is advantageously completed by a gas treatment train comprising:

a post-combustion chamber;
a cooler;
at least one filter; and
a hydrogen chloride neutralizing system.

DETAILED DESCRIPTION OF ONE EMBODIMENT

The single FIGURE shows a facility according to the invention for the implementation of the method according to the invention, for the purpose of incinerating, melting and vitrifying mixed waste.

It is set forth hereinafter that the present description indifferently uses the terms incineration and combustion to designate the same treatment.

A first main element of the facility is a combustion reactor 10 with a cool or warm metal wall. The inside of the reactor contains oxygen, which is heated by one or more plasma torches 14. The latter can be arc or induction plasma torches.

A basket 18 is placed inside the reactor 10 and contains a waste bag 30. This assembly is suspended inside the reactor 10. To do so, the reactor 10 is completed by an air lock 12 for introducing each basket 18 inside the reactor 10. Preferably, the basket 18 is of fibre glass; such a basket enables waste to be incinerated for a duration higher than fifteen minutes in a reactor or an incinerator, without waste being molten beforehand, in particular when inserted in the reactor 10. As the method according to the invention plans to treat metal elements, this basket 18 can include a light metal structure. This basket 18 is suspended in the upper part of the reactor 10, above flames produced by the plasma torches 14. Finally, a gas outlet 16 is provided in the upper part of the reactor 10; according to another alternative, this gas outlet 16 can also be positioned in the lower part of the reactor 10 to pass the gases in the heated zone by the plasma and to promote their oxidation.

Another essential element of this facility is an induction furnace 20, of the "In Can Melter"-type. Such a furnace type operates by induction and comprises a liner 21, completed by a lower sole 22. A crucible-forming container 23 is placed inside the assembly and is removable. It can comprise in turn a heat resistant inner layer and thus resisting to the aggressivity of the molten bath and an insulating outer layer. Finally, an inductor 24 is placed around the liner 21. This FIGURE also shows inside the crucible-forming container 23 a molten glass mass 26 positioned above a molten metal mass 28 lying on the lower part of the crucible-forming container 23.

This furnace 20 enables the metal phase 28 to be molten by direct induction, as well as the glass phase 26, which is located thereabove; this glass phase 26 is also heated from below by contacting the molten metal and from above with the hot atmosphere being inside the reactor 10 and possibly with the radiation of the plasma torches placed above.

The facility is advantageously completed by an assembly for treating the gases from the reactor 10. It is planned to provide post-combustion of these gases therein, that is the entire oxidation thereof, phosphatizing metal chlorides formed during the combustion of the organic waste including chlorides, filtering dust driven in these gases and recycling it in the melting furnace 20, and neutralizing the decontaminated gases. To succeed in carrying out these different operations, the post-combustion chamber, a cooler, an eletro-filter-type filter or a filtering media filter, another very high efficiency filter and a hydrogen chloride neutralizing system can be used.

The detailed process of the method according to the invention is the following one.

The process begins with sealingly assembling the reactor 10 for incinerating waste and the furnace 20 for melting metal and glass.

Then, there is a possible sealed connection of the gas treatment train, connected to the gas outlet 16 of the reactor 10, when this connection is not permanent. Then, this gas treatment train is activated. The inductor 24 of the melting furnace 20 is also activated.

The plasma torches 14 of the reactor 10 are then ignited to preheat the inside of the reactor 10, that is the oxygen loaded gas atmosphere.

Then, the air lock 12 is opened to introduce a waste bag 30 in a first basket 18. Thus, the latter is placed inside the reactor 10, suspended above the flames of the plasma torches 14.

Then, the air lock 12 for introducing waste is closed.

The gradual combustion of waste present in the waste bag 30 can then occur. Gases derived from this combustion can be treated, as well as recovered dust, by virtue of the filtration in the gas treatment train. The power of the plasma torches 14 can be modulated to control the outlet temperature of the combustion gases.

At the end of the combustion of waste present in the waste bag 30, the basket 18 is lowered in the furnace 20.

Melting the residual fractions derived from the incineration of waste, that is metals and residues of organic materials, as well as ashes and minerals, such as glass fibre, among other things, from the basket 18, thus occurs inside the furnace 20. Then two phases are formed: a heavy metal phase 28, and a lighter glass phase 26 which is positioned above the metal phase 28.

If other waste is to be treated, this cycle is then resumed, with the opening of the air lock 12 and the following steps, until the end of the metal and glass melting for all the waste, until a final desired composition of metal and glass is obtained, up to the complete filling of the internal volume of the crucible-forming container 23 of the furnace 20.

It is noted that the last waste bag 30 can also contain filtration dust recovered in the gas treatment train upon incinerating the previous bags.

When there is no more waste to treat, the following operations are performed:

shutting down the plasma 14;
stopping the operation of the inductor 24 of the furnace 20;
cooling the inside of the crucible-forming container 23 and the reactor 10;
separating the furnace 20 for melting metal and glass from the reactor 10 for incinerating waste and disassembling the crucible-forming container 23.

A possible inspection of the reactor 10 can then occur.

In an exemplary embodiment, operational sequences of such a facility for about twenty bags of around 28 kg, each containing 10 kg of organic waste, 15 kg of metal waste and 3 kg consisting of the basket 18, comprised of metal and glass fibre are contemplated.

From the dimensioning point of view, the combustion chamber of the reactor 10 is cylindrical and with a diameter about 1 m, a height equal to about 2 m, its exchange area with gases being about 7 m$^2$ and its volume about 1.60 m$^3$.

The plasma torches 14 which are used can each have a power of 75 KW. The crucible-forming container 23, which makes up the final container in which waste will be packaged, warehoused and stored, is cylindrical with a diameter of about 500 mm and an effective height of about 500 mm.

In this case, the incineration capacity is about 20 kg per hour of organic waste the mean internal combustion power of which is in the order of 33 MJ/kg. This results in a combustion duration of each bag in the order of 30 minutes. The oxygen flow rate necessary during this combustion period is higher than 60 kg/h to be able to be in overstoichiometry. The volume of such a chamber enables a mean residence time for the gases in the reactor 10 of more than about ten seconds. The oxygen overstoichiometry, associated with a mean residence time for the gases in the reactor of about ten seconds, enables organic waste to be completely oxidized.

The power provided by the waste combustion is then about 183 kW and is completed by the power provided by the plasma torches 14, that can reach 150 KW. This power can be modulated to regulate the gas temperature at the outlet of the reactor 10. A small part of the power provided by the waste combustion and the plasma torches 14 is used to raise the temperature of burnt gases, up to the operating temperature of the reactor 10, that is between 800 and 1000° C. However, most of this power is transferred by a heat exchange to the cool walls of the reactor 10.

After the end of the waste combustion, the basket 18 containing the ashes, coming from this combustion, is lowered in the metal and glass bath of the furnace 20, so as to enable metals and minerals to be molten. The metal is held in a molten state therein through direct induction heating, thanks to the inductor 24. It is set forth that, as soon as an n-rank basket 18 is lowered in the furnace 20, an n+1-rank new basket is introduced in the reactor 10 by the air lock 12, this operation lasting in the order of less than 15 minutes.

Finally, by way of example, after the treatment of about twenty waste bags, and depending on the waste composition, the furnace 20 can contain a mass of 375 kg metal and 180 kg glass formed from glass fibre of the baskets 18, ashes, dust from the combustion and mineral additives for adjusting its chemical composition.

ADVANTAGES OF THE INVENTION

Associating a reactor, of the cool metal wall combustion type, with a pure oxygen combustion enables combustion gas flow rates to treat to be minimized, with respect to air combustion, which includes 80% of nitrogen useless for this combustion. This enables a reasonable gas temperature to be held, that is lower than 1200° C., to avoid, for example, the premature melting of the basket 18 of glass fibre, which carries waste. Indeed, the additional calories are absorbed by the cold wall of the reactor 10. This association enables the global dimensions of the reactor 10 for incinerating and treating the gases to be minimized. The association of the feeding system with an air lock 12, for introducing waste contained in a basket 18 of glass fibre, and the oxygen plasma medium combustion reactor 10 with a cold metal wall, enables the dimensions of this reactor 10 and the entire gas treatment to be minimized, with a stable combustion flow rate, while keeping the advantage of treating entire waste bags, without opening them, nor grinding them, to thus avoid any dissemination of the radioactive contamination.

Such a reactor 10, which is thus cooled, is not corroded by the combustion gases, which results in extending its lifetime.

Between two use sequences of the facility, according to the invention, it is also possible and easy to inspect and wash the reactor 10.

The use of a metal and glass melting furnace 20, of the In Can Meter-type, leads, because of its sequential operation, to regular shutdowns of the facility, with a change of the crucible-forming container of the melting furnace. This facilitates managing the criticality, since there cannot be an accumulation of fissile material in the crucible-forming container 23 of the melting furnace 20.

The association of the In Can Melter-type furnace 20 with the cold or warm metal wall combustion reactor 10 is particularly relevant, because the reactor 10 can be very rapidly cooled. This enables the furnace 20 to be disconnected from the reactor 10 while cold, so as to change the crucible-forming container 23, without wasting time.

The invention claimed is:

1. A method for incinerating, melting and vitrifying mixed waste including metal and organic waste,
the method comprising the following steps of:
introducing in an oxygen plasma medium incinerating reactor with a cold or warm metal wall, by means of a basket of glass fiber, through an air lock opening into the reactor, waste placed in a bag, said bag being placed in the basket;
incinerating waste in the reactor;
melting residual fractions derived from the incineration of waste and the basket, in an induction furnace, of the type with melting in a crucible-forming container, this furnace being placed below the reactor;
vitrifying molten residual fractions into a glass matrix;
repeating this cycle for each basket;
dismantling the furnace and disassembling the crucible-forming container.

2. The method according to claim 1, further comprising treating the residual gases from incineration, which comprises the following steps of:
post-combusting gases from the incineration;
phosphatizing metal chlorides formed during the incineration;
filtering dust;
recycling the dust in the furnace;
neutralizing the decontaminated gases.

3. The method according to claim 1, wherein before the step of dismantling the furnace, the method further comprises:
shutting down the plasma torches of the reactor and of furnace; and
cooling the entire facility.

4. The method according to claim 1, wherein after the step of dismantling the furnace, the method further comprises:
inspecting the reactor.

5. The method according to claim 1, wherein the mixed waste contains mineral materials, on the one hand, and radiologically contaminated and/or toxic waste, on the other hand.

6. A facility for implementing a method for incinerating, melting and vitrifying waste including metal and organic waste, wherein the facility comprises:

an oxygen plasma medium incinerating reactor with a cool or warm metal wall, comprising at least one plasma torch and an introducing air lock adapted for introducing baskets containing a bag of waste to be incinerated in the reactor, the waste including glass fiber; and an induction melting furnace, of the type with melting in a crucible-forming container, the melting furnace being positioned below the reactor, the furnace being dismountable and adapted to melt residual fractions derived from the incineration of waste and the basket and to vitrify molten residual fractions into a glass matrix, the furnace being positioned below the reactor, wherein the crucible-forming container being adapted to be disassembled.

7. The facility according to claim 6, further comprising a gas treatment train, consisting of:

a post-combustion chamber;

a cooler;

at least one filter; and a hydrogen chloride neutralizing system.

* * * * *